United States Patent
Sung et al.

(10) Patent No.: US 10,135,707 B2
(45) Date of Patent: Nov. 20, 2018

(54) PLAYOUT DELAY ADJUSTMENT METHOD AND ELECTRONIC APPARATUS THEREOF

(71) Applicant: SAMSUNG ELECTRONICS CO., LTD., Suwon-si (KR)

(72) Inventors: Ho-sang Sung, Yongin-si (KR); Anton Porov, Saint-Petersburg (RU); Konstantin Osipov, Saint-Petersburg (RU); Eun-mi Oh, Seoul (KR); Cheol-hoon Baek, Seoul (KR); Nam-il Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

(21) Appl. No.: 15/393,437

(22) Filed: Dec. 29, 2016

(65) Prior Publication Data

US 2017/0201443 A1     Jul. 13, 2017

(30) Foreign Application Priority Data

Jan. 7, 2016    (KR) .................. 10-2016-0002193

(51) Int. Cl.
*H04L 12/26*     (2006.01)
*H04L 29/06*     (2006.01)
(Continued)

(52) U.S. Cl.
CPC ........ *H04L 43/0858* (2013.01); *H04J 3/0632* (2013.01); *H04L 43/0835* (2013.01);
(Continued)

(58) Field of Classification Search
CPC ......... H04N 21/8456; H04N 21/44209; H04N 21/23106; H04N 21/845; H04N 21/83;
(Continued)

(56) References Cited

U.S. PATENT DOCUMENTS 6,157,653 A * 12/2000 Kline .................... H04J 3/0632
370/412
6,735,192 B1 * 5/2004 Fried ................. H04L 29/06027
370/352
(Continued)

FOREIGN PATENT DOCUMENTS

| EP | 2276220 A1 | 1/2011 |
|---|---|---|
| KR | 1020110113864 A | 10/2011 |
| KR | 1020130094152 A | 8/2013 |

OTHER PUBLICATIONS

"3rd Generation Partnership Project; Technical Specification Group Services and System Aspects; Codec for Enhanced Voice Services (EVS); Jitter Buffer Management Release 13", 3GPP TS 26.448 V13.0.0, (Dec. 2015), Total 22 pages.

*Primary Examiner* — Jung Liu
(74) *Attorney, Agent, or Firm* — Sughrue Mion, PLLC

(57) ABSTRACT

An electronic apparatus and a playout delay adjustment method thereof are provided. The electronic apparatus includes a target playout delay estimator configured to estimate an initial target playout delay of a current frame by using network status information of a played packet and estimate a final target playout delay of the current frame by updating the estimated initial target playout delay based on real delay information of an unplayed packet, and an adaptation controller configured to determine an adaptation method for adjusting a playout delay of the current frame based on the final target playout delay.

20 Claims, 16 Drawing Sheets

(51) Int. Cl.
*H04J 3/06* (2006.01)
*H04L 12/853* (2013.01)
*H04L 12/823* (2013.01)
*H04L 12/841* (2013.01)

(52) U.S. Cl.
CPC ...... *H04L 43/0847* (2013.01); *H04L 65/1059* (2013.01); *H04L 65/80* (2013.01); *H04L 43/087* (2013.01); *H04L 47/2416* (2013.01); *H04L 47/283* (2013.01); *H04L 47/32* (2013.01)

(58) Field of Classification Search
CPC ......... H04N 21/25808; H04N 21/2401; H04N 21/84; H04N 21/440227; H04N 21/4341; H04N 21/2368; H04N 21/236; H04N 21/434; H04N 21/4382; H04N 21/4384; H04N 21/438; H04N 21/4383; H04N 21/4307; H04N 21/23424; H04N 21/4302; H04N 21/40; H04L 65/607; H04L 65/602; H04L 65/4084; H04L 45/24; H04L 1/0017; H04L 1/06; H04L 1/02; H04B 7/04; H04B 7/02; H04B 7/00; H04W 28/24; H04W 28/22; H04W 92/045

See application file for complete search history.

(56) References Cited

U.S. PATENT DOCUMENTS

| | | |
|---|---|---|
| 7,246,057 B1 | 7/2007 | Sundqvist et al. |
| 7,599,399 B1 | 10/2009 | Bugenhagen |
| 7,733,893 B2 | 6/2010 | Lundin |
| 7,817,677 B2 | 10/2010 | Black et al. |
| 7,826,441 B2 | 11/2010 | Black et al. |
| 7,830,900 B2 | 11/2010 | Black et al. |
| 8,085,678 B2 | 12/2011 | Spindola et al. |
| 8,331,385 B2 | 12/2012 | Black et al. |
| 8,363,678 B2 | 1/2013 | Lam |
| 8,576,884 B2 | 11/2013 | Jougit et al. |
| 8,774,028 B2 | 7/2014 | Lee et al. |
| 2003/0152094 A1 | 8/2003 | Colavito et al. |
| 2005/0207437 A1 | 9/2005 | Spitzer |
| 2008/0205856 A1* | 8/2008 | Kim .................. H04N 21/44004 386/290 |
| 2011/0222423 A1 | 9/2011 | Spindola et al. |

* cited by examiner

PLAYOUT DELAY ADJUSTMENT METHOD AND ELECTRONIC APPARATUS THEREOF

CROSS-REFERENCE TO RELATED APPLICATIONS

This application claims priority from Korean Patent Application No. 10-2016-0002193, filed on Jan. 7, 2016, in the Korean Intellectual Property Office, the disclosure of which is incorporated herein by reference in its entirety.

BACKGROUND

Field

Apparatuses and methods consistent with the present inventive concept relate to a playout delay adjustment method and an electronic apparatus thereof, and more particularly, to a playout delay adjustment method of providing a high-quality audio and adjusting a playout delay, and an electronic apparatus thereof.

Description of the Related Art

In a packet-based communication system, a packet is delayed or lost due to a network status or audio processing and thus is unreliable and unstable. When a transmitted packet is delayed or lost at a tolerance value or more, an active error adjustment function of requesting a retransmission of the packet is provided. Therefore, an additional delay occurs, and thus it is difficult to apply the packet to a call service that may support real-time conversations.

As a result, methods of decreasing a packet delay and/or packet loss and keeping a flow of a packet to continuously output a voice signal through a voice decoder have been developed. These methods may include a Jitter Buffer Management (JBM) method of adjusting a playout delay in a packaging section and a voice section by using Time Scale Modification (TSM) processing as the most efficient method in an environment where a network characteristic varies with time. Therefore, there is a need for the JBM method to decrease a playout delay or compensate for a packet error according to various network situations.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

The present inventive concept provides a playout delay adjustment method of providing a high-quality audio and adjusting a playout delay through a jitter buffer or a Time Scale Modification (TSM) adaptor, and an electronic apparatus thereof.

According to an aspect of the present inventive concept, a playout delay adjustment method of an electronic apparatus includes estimating an initial target playout delay of a current frame by using network status information of a played packet, estimating a final target playout delay of the current frame by updating the estimated initial target playout delay based on real delay information of an unplayed packet, and determining an adaptation method for adjusting a playout delay of the current frame based on the final target playout delay.

The playout delay adjustment method may further include determining a network parameter by using the network status information of the played packet and acquiring an estimation function for estimating the initial target playout delay by using the network parameter.

The playout delay adjustment method may further include adjusting a number of arrays used for estimating a target playout delay according to a network status. The network parameter may be determined based on information about the adjusted number of arrays and the network status information of the played packet.

The estimating of the final target playout delay may include calculating an error value based on a difference between an initial target playout delay value of the current frame acquired by using the estimation function and a real transmission delay value of the unplayed packet, calculating a delay modifier based on network statistics, and acquiring a final estimation function for estimating final target playout delay information based on the estimation function, the error value, and the delay modifier.

The network status information may be updated by the error value.

The calculating the error value may comprise comparing the initial target playout delay value of the current frame and a target playout delay value of the previous frame and calculating the error value based on a result of the comparing.

The playout delay adjustment method may further include determining late loss of the current frame. The determining of the late loss may include determining an adaptation method based on a playout delay estimation value of the current frame acquired through the final estimation function, a playout delay value of a previous frame, and information about the late loss.

The determining of the late loss of the current frame may comprise determining whether an order of a frame is changed, and the frame is dropped when it is determined that the order of the frame is changed.

The adaptation method may be one selected from an adaptation method of removing a current frame, an adaptation method of decoding a current frame to decrease Time Scale Modification (TSM), an adaptation method of decoding a current frame to increase TSM, and an adaptation method of inserting a zero frame.

The electronic apparatus may operate in one of a sound quality maximization mode and a delay minimization mode according to a type of service performing a voice call to estimate a target playout delay.

According to another aspect of the present inventive concept, an electronic apparatus includes a target playout delay estimator configured to estimate an initial target playout delay of a current frame by using network status information of a played packet and estimate a final target playout delay of the current frame by updating the estimated initial target playout delay based on real delay information of an unplayed packet, and an adaptation controller configured to determine an adaptation method for adjusting a playout delay of the current frame based on the final target playout delay.

The electronic apparatus may further include a parameter determiner configured to determine a network parameter by using the network status information of the played packet. The target playout delay estimator may acquire an estimation function for estimating the initial target playout delay by using the network parameter.

The parameter determiner may adjust the number of arrays used for estimating a target playout delay according to a network status and determine the network parameter based on information about the number of arrays and the network status information of the played packet.

The target playout delay estimator may acquire a difference between an initial target playout delay value of the current frame acquired by using the estimation function and a real transmission delay value of an unplayed packet, calculate an error value based on the difference, calculate a delay modifier based on network statistics, and acquire a final estimation function for estimating final target play delay information based on the estimation function, the error value, and the delay modifier.

The network status information may be updated by the error value.

The target playout delay estimator may compare the initial target playout delay value of the current frame and a target playout delay value of the previous frame and calculate the error value based on a result of the comparing.

The electronic apparatus may further include a late loss determiner configured to determine late loss information of the current frame. The adaptation controller may determine an adaptation method based on a playout delay estimation value of the current frame acquired through the final estimation function, a playout delay value of a previous frame, and the late loss information.

The late loss determiner may determine whether an order of a frame is changed and the frame is dropped when it is determined that the order of the frame is changed.

The adaptation method may be one selected from an adaptation method of removing a current frame, an adaptation method of decoding a current frame to decrease TSM, an adaptation method of decoding a current frame to increase TSM, and an adaptation method of inserting a zero frame.

The electronic apparatus may operate in one of a sound quality maximization mode and a delay minimization mode according to a type of service performing a voice call to estimate a target playout delay.

According to another aspect of the present inventive concept, a non-transitory computer readable recording medium stores a program for performing a playout delay adjustment method of an electronic apparatus. The playout delay adjustment method includes estimating an initial target playout delay of a current frame by using network status information of played packet, estimating a final target playout delay of the current frame by updating the estimated initial target playout delay based on real delay information of an unplayed packet, and determining an adaptation method for adjusting a playout delay of the current frame based on the final target playout delay.

According to another aspect of the present inventive concept, a playout delay adjustment method of an electronic apparatus includes setting a mode of the electronic apparatus to one of a delay minimization mode and a sound quality maximization mode based on one of a communication service and a coding mode, estimating a target playout delay of a current frame according to the set mode, and determining an adaptation method of adjusting a playout delay of the current frame based on the estimated target playout delay.

According to another aspect of the present inventive concept, a method for processing a packet in a receiver includes determining whether samples sufficient for playing an audio signal are available in a jitter buffer, estimating a playing time of the audio signal in response to determining that the samples are not available in the jitter buffer, estimating a target playout delay based on network delay information of a played packet and network delay information of an unplayed packet, determining whether a late loss occurs based on the estimated target playout delay, and determining an adaption method for adjusting a playout delay of a current frame based on information on the late loss.

A zero frame may be inserted into the current frame or the current frame may be deleted according to the determined adaptation method.

According to another aspect of the present inventive concept, a receiver includes a packet separator configured to analyze a packet stream and extract frames embedded in a packet of the packet stream, a jitter buffer configured to store the extracted frames, a late loss determiner configured to determine late loss information of a current frame, a parameter determiner configured to determine network parameters, a target playout delay estimator configured to estimate an initial target playout delay of the current frame based on a played packet and estimate a final target playout delay of the current frame by updating the estimated initial target playout delay using real delay information of an unplayed packet, and an adaptation controller configured to determine an adaptation method for adjusting a playout delay of the current frame based on the final target playout delay.

The receiver may further include a decoder configured to decode the current frame and a Time Scale Modification (TSM) applier configured to perform TSM for time shrinking or time stretching of the current frame in response to the adaptation method determined by the adaptation controller.

According to various exemplary embodiments of the present inventive concept, a high-quality audio may be provided, and a playout delay may be decreased or a packet error may be compensated for according to various network situations.

Additional and/or other aspects and advantages of the inventive concept will be set forth in part in the description which follows and, in part, will be obvious from the description, or may be learned by practice of the inventive concept.

BRIEF DESCRIPTION OF THE DRAWING FIGURES

The above and/or other aspects of the present inventive concept will be more apparent by describing certain exemplary embodiments of the present inventive concept with reference to the accompanying drawings, in which.

DETAILED DESCRIPTION OF EXEMPLARY EMBODIMENTS

Figure 1A:
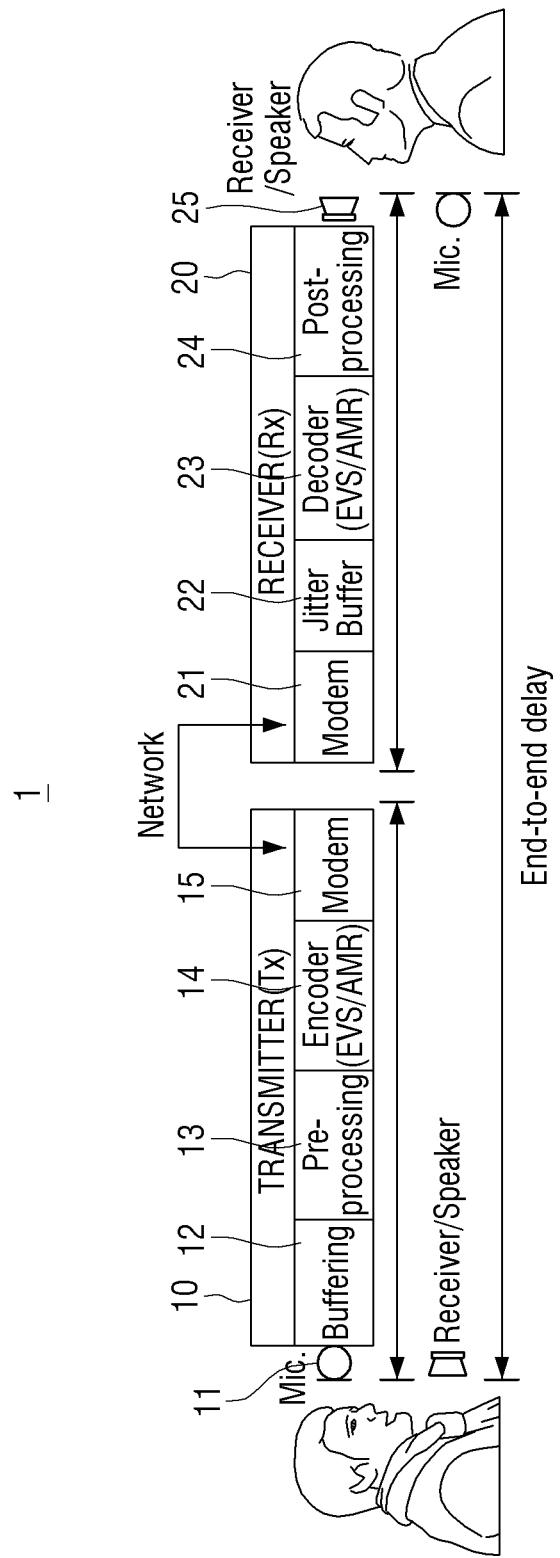
FIG. 1A is a block diagram of a configuration of a communication system having a playout delay adjustment function according to an exemplary embodiment of the present inventive concept.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the inventive concept. Thus, it is apparent that exemplary embodiments of the present inventive concept can be carried out without those specifically defined matters. Also, well-known functions or constructions are not described in detail since they would obscure the inventive concept with unnecessary detail.

The terms first, second, etc. may be used herein to describe various elements, these elements may not be limited by these terms. These terms are merely used to distinguish one element from another element.

The terminology used herein is for describing particular embodiments merely and is not intended to be limiting of embodiments. The terminology used herein selects general terms that consider a function of the present inventive concept and are currently widely used. However, this may vary according to intentions of those skilled in the art, precedents, appearances of new technologies, or the like. Also, there are terms that are arbitrarily selected by an applicant in a particular case, and their meanings may be described in detail in a description part of an exemplary embodiment corresponding to this case. Therefore, the terms used herein may be defined based on meanings of the terms and all contents of the present inventive concept not based on names of the terms.

As used herein, the singular forms include plural forms as well, unless the context clearly indicates otherwise. It will be understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the attached drawings.

FIG. 1A illustrates a communication system 1 having a playout delay adjustment function according to an exemplary embodiment of the present inventive concept. As shown in FIG. 1A, the communication system 1 includes an electronic apparatus 10 which may include a transmitter Tx and an electronic apparatus 20 which may include a receiver Rx. Here, the electronic apparatuses 10 and 20 may be portable terminals such as smartphones or the like, but this is merely an exemplary embodiment. Therefore, the electronic apparatuses 10 and 20 may be realized as various types of electronic apparatuses such as personal digital assistants (PDAs), tablet PCs, notebook PCs, desktop PCs, smart TVs, etc.

The electronic apparatus 10 may request a phone call from the electronic apparatus 20. The electronic apparatus 10 may negotiate call conditions through a signaling path and transmit real encoded data through a media path.

In particular, the electronic apparatus 10 may perform an analog-to-digital (A/D) conversion with respect to a voice signal of a user received through a microphone 11, store the voice signal in a buffer 12, and process the voice signal in unit of frames. Also, the electronic apparatus 10 may perform pre-processing 13 to perform a process of improving a sound quality of the voice signal input through the microphone 11. For example, the electronic apparatus 10 may perform a sound quality improving process to improve a quality of a call by using a module such as an echo canceller (EC), noise suppression (NS), gain control, or the like. The electronic apparatus 10 may compress the voice signal by using an encoder 14 (e.g., $3^{rd}$ Generation Partnership Project (3GPP) Enhanced Voice Service (EVS)/AMR-NB/AMR-WB or the like) to generate a bitstream, packetize the bitstream through a modem 15, and transmit the packet to a network. A service that performs communications in unit of packets indicates an example of a voice over Long Term Evolution (VoLTE) service.

The electronic apparatus 20 may store a packet received through the modem 21 in a jitter buffer 22. The electronic apparatus 20 may also remove jitter occurring due to a transmission delay of each transmitted packet through Jitter Buffer Management (JBM) and enable smooth voice decoding. The electronic apparatus 20 may decode the packet, from which the jitter is removed and uniformed, through a decoder 23 (e.g. 3GPP EVS/AMR-NB/AMR-WB, or the like) and perform post-processing 24 with respect to the decoded signal to improve a sound quality improving process. The electronic apparatus 20 may perform a digital-to-analog (D/A) conversion with respect to the voice signal having the improved sound quality and output the voice signal through a receiver or a speaker 25.

Figure 1B:
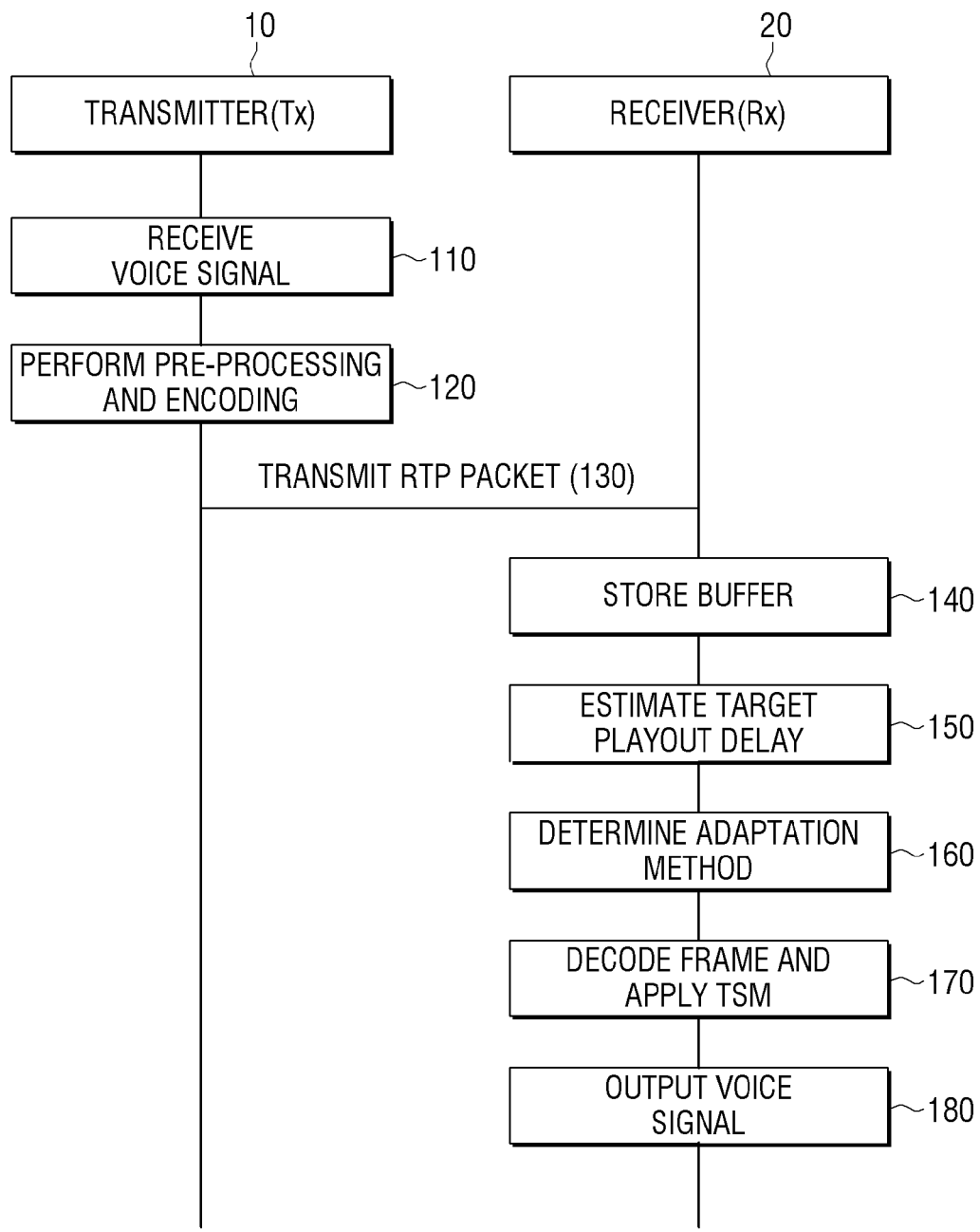
FIG. 1B illustrates a voice signal transmission of a communication system having a playout delay adjustment function according to an exemplary embodiment of the present inventive concept.

FIG. 1B is a sequence diagram illustrating a voice signal transmission of a communication system having a playout delay adjustment function, according to an exemplary embodiment of the present inventive concept. The communication system 1 of FIG. 1A may use a JBM algorithm used in a packet-based communication system.

The electronic apparatus 10 receives a voice signal through the microphone 11 in operation 110. Here, the electronic apparatus 10 may form the received voice signal into an audio frame having units of 20 ms.

In operation 120, the electronic apparatus 10 improves a sound quality of the voice signal through pre-processing and encodes the audio frame. Here, the electronic apparatus 10 may Real-time Transport Protocol (RTP)-packetize the audio frame to transmit the audio frame to the electronic apparatus 20.

In operation 130, the electronic apparatus 10 transmits an RTP packet to the electronic apparatus 20. Here, the electronic apparatus 20 may receive the RTP packet every 20 ms.

In operation 140, the electronic apparatus 20 stores the received RTP packet in a jitter buffer. Here, the electronic apparatus 20 may separate a frame from the RTP packet and store the frame in a buffer.

In operation 150, the electronic apparatus 20 estimates a target playout delay of a received current frame. In operation 160, the electronic apparatus 20 determines an adaptation method based on the estimated target playout delay of the current frame. This will be described in detail later.

In operation 170, the electronic apparatus 20 decodes the audio frame according to the determined adaptation method to apply Time Scale Modification (TSM).

In operation 180, the electronic apparatus 20 outputs the processed voice signal.

Figure 2A:
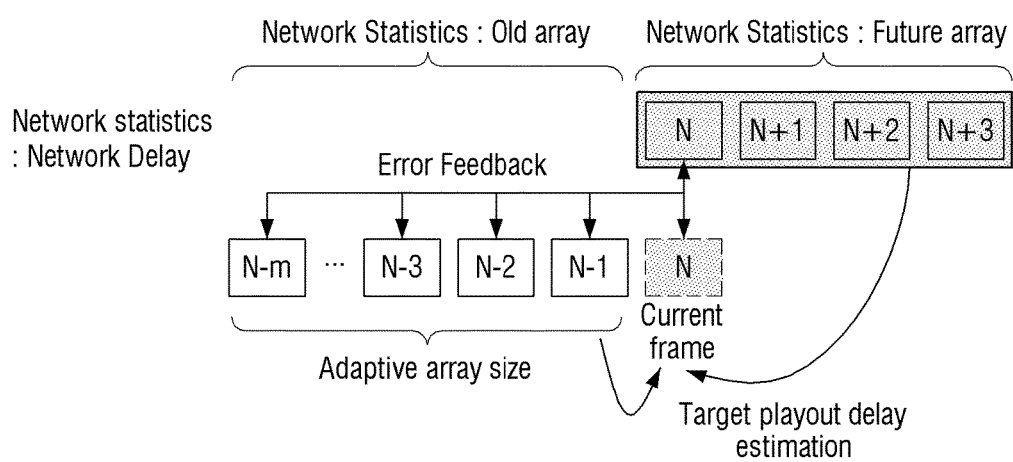
FIG. 2A illustrates an example of using information of an unplayed packet according to an exemplary embodiment of the present inventive concept.

FIG. 2A illustrates an example of using information of an unplayed packet, according to an exemplary embodiment of the present inventive concept. In the exemplary embodiment, received packets are classified into two sets. In detail, the electronic apparatus 20 estimates a target playout delay of a current frame by using a played packet and an unplayed packet based on a current time. In particular, the electronic apparatus 200 may acquire an initial estimation function by using network status information of the played packet, compare an estimated value of the current frame acquired through the initial estimation function with a real transmission delay value corresponding to the unplayed packet to acquire an error value, and receive a feedback on the error value to update the initial estimation function so as to acquire a final estimation function. In this case, the playout delay value of the current frame may be estimated to be closer to a real value so as to increase an accuracy of a delay estimation. Therefore, if a transmission delay of a future frame is accurately estimated, a buffer management may be further efficiently performed, and thus a packet management delay may be minimized.

Figure 2B:
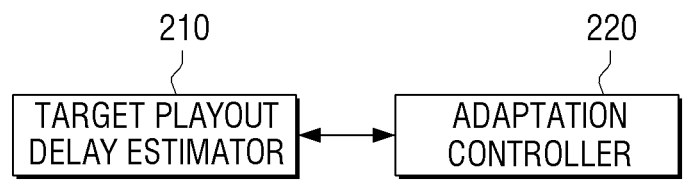
FIG. 2B is a block diagram of a brief configuration of an electronic apparatus according to an exemplary embodiment of the present inventive concept.

FIG. 2B is a block diagram of a brief configuration of the electronic apparatus 20 according to an exemplary embodiment of the present inventive concept. As shown in FIG. 2B, the electronic apparatus 20 includes a target playout delay estimator 210 and an adaptation controller 220.

The target playout delay estimator 210 estimates an initial target playout delay of a current frame by using network status information of a played packet and updates the estimated initial target playout delay based on real delay information of an unplayed packet to estimate a final target playout delay of the current frame.

In detail, the target playout delay estimator 210 may acquire an initial estimation function by using a network parameter determined by using the network status information of the played packet. Here, the network parameter may be determined based on the number of arrays used for estimating a target playout delay and a network delay value of the played packet. Also, the number of arrays used for estimating the target playout delay may be adjusted according to a status of a network.

The target playout delay estimator 210 may calculate an error value through a difference between the initial target playout delay of the current frame acquired by using the initial estimation function and the real transmission delay value of the unplayed packet. The target playout delay estimator 210 may also calculate a delay modifier based on network statistics, set mode information, etc. The target playout delay estimator 210 may acquire a final estimation function for estimating final target playout delay information based on the initial estimation function, the error value, and the delay modifier and acquire a target playout delay value of the current frame through the final estimation function. Here, the network status information of the played packet may be updated by the error value.

The adaptation controller 220 may determine an adaptation method for adjusting a playout delay of the current frame based on the final target playout delay information. Here, the adaptation controller 220 may determine the adaptation method by using a target playout delay value of the current frame, a playout delay value of a previous frame, late loss information, and the number of samples per one frame. The adaptation method may be one selected from an adaptation method of removing a current frame, an adaptation method of decoding a current frame to decrease TSM, an adaptation method of decoding a current frame to increase TSM, and an adaptation method of inserting a zero frame.

Figure 2C:
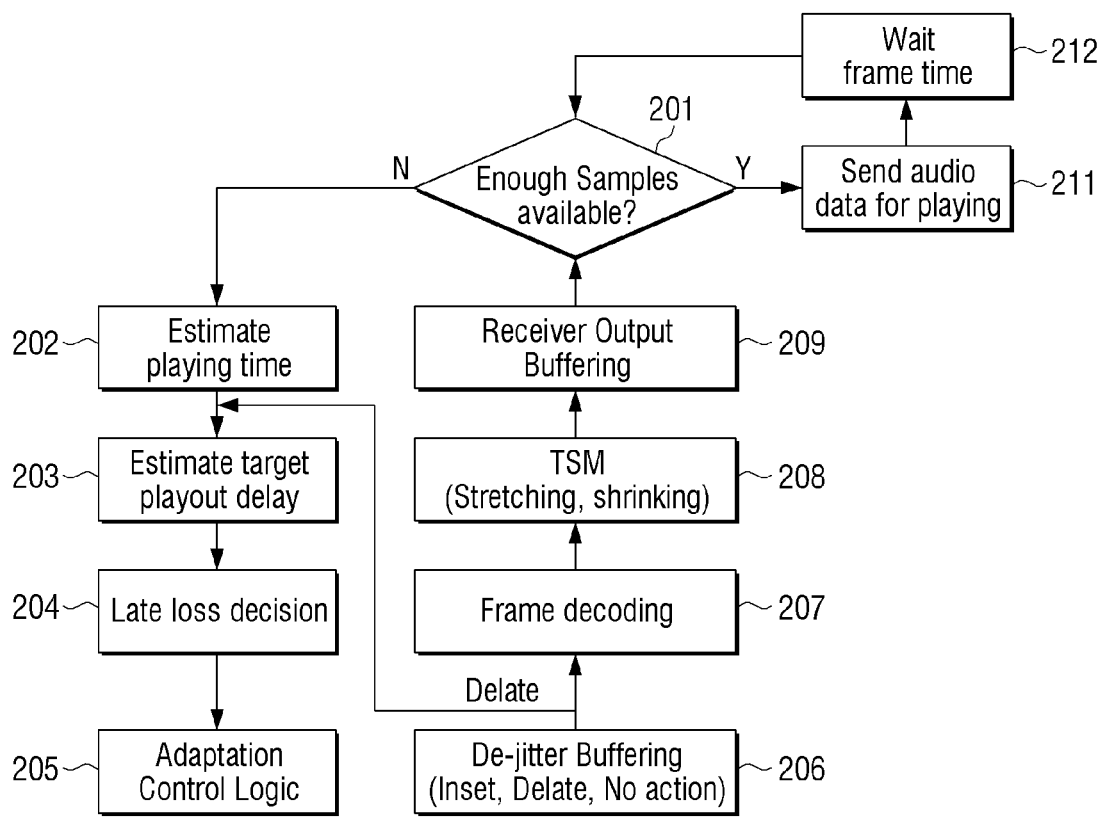
FIG. 2C is a flowchart of a packet processing process of an electronic apparatus according to an exemplary embodiment of the present inventive concept.

FIG. 2C is a flowchart of a packet processing process of the electronic apparatus 20 according to an exemplary embodiment of the present inventive concept.

In operation 201, the electronic apparatus 20 determines whether enough samples are available in a jitter buffer.

When the enough samples are not available in the jitter buffer, the electronic apparatus 20 estimates a playing time of an audio signal in operation 202.

In operation 203, the electronic apparatus 20 estimates a target playout delay based on network delay information of a played packet and network delay information of an unplayed packet.

In operation 204, the electronic apparatus 20 determines whether a late loss occurs based on the estimated target playout delay.

In operation 205, the electronic apparatus 20 determines an adaptation method for adjusting a playout delay of a current frame based on the determined late loss information. The adaptation method may include frame inserting/deleting, stretching/shrinking of TSM, and no action.

In operation 206, the electronic apparatus 20 performs de-jitter buffering according to the adaptation method. In detail, if the adaptation method is determined as the frame inserting, the electronic apparatus 20 may insert a zero frame into the current frame to increase a delay. Here, the zero frame may be processed as no data frame. If the adaptation method is determined as the frame deleting, the electronic apparatus 20 performs a job of deleting the current frame. If the current frame is deleted, the electronic apparatus 20 may perform operation 203 with respect to a next frame without performing a process of decoding a frame.

After performing de-jitter buffering, the electronic apparatus 20 performs decoding with respect to the current frame according to a codec used for the current frame in operation 207.

If the adaptation method is determined as stretching or shrinking of TSM after performing decoding, the electronic apparatus 20 performs a TSM adjustment in operation 208. The electronic apparatus 20 may decrease or increase a playout speed of the current frame through a TSM module to process the current frame.

In operation 209, the electronic apparatus 20 performs receiver output buffering with respect to audio data of a sample unit corresponding to a current frame having an adjusted size.

If the enough samples are available in the jitter buffer, the electronic apparatus 20 transmits the audio data to a receiver to play a voice signal in operation 211.

The electronic apparatus 20 waits for a time corresponding to one frame in operation 212 and checks whether the enough samples are available in the jitter buffer in operation 201.

Figure 3:
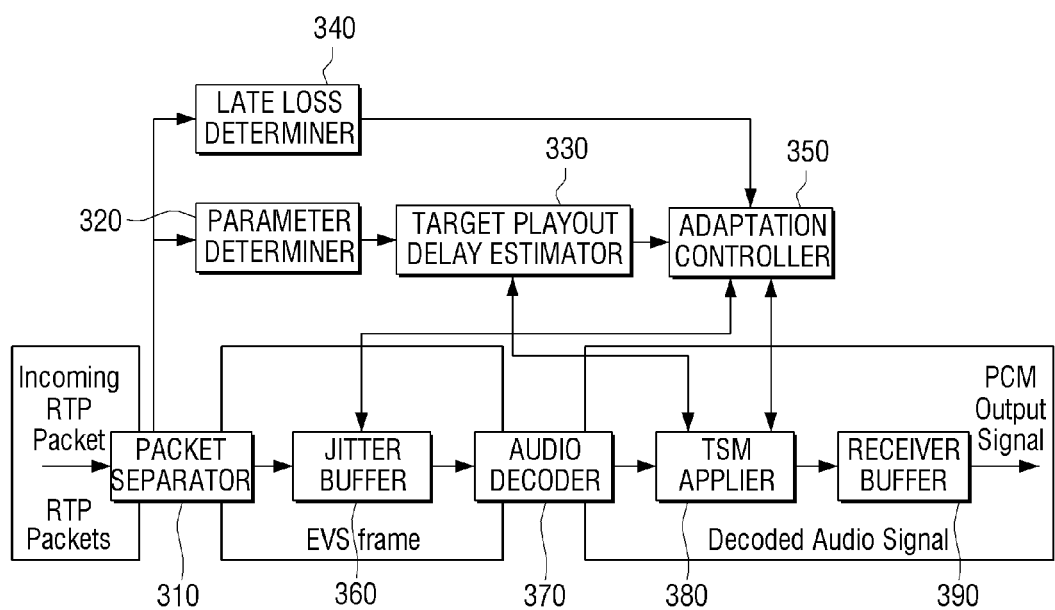
FIG. 3 is a block diagram of a detailed configuration of an electronic apparatus having a playout delay adjustment function according to an exemplary embodiment of the present inventive concept.

FIG. 3 is a block diagram of a detailed configuration of an electronic apparatus 200 having a playout delay adjustment function according to an exemplary embodiment of the present inventive concept. As shown in FIG. 3, the electronic apparatus 200 includes a packet separator 310, a parameter determiner 320, a target playout delay estimator 330, a late loss determiner 340, an adaptation controller 350, a jitter buffer 360, an audio decoder 370, a TSM applier 380, and a receiver buffer 390. A function of the electronic apparatus 200 of FIG. 3 complies with 3 GPP TS 26.448.

Referring to FIG. 3, the packet separator 310 may analyze a packet stream received through a transmission channel or a modem and extract frames embedded in a packet and metadata for estimating a network delay value. The extracted frames may be provided to the jitter buffer 360. For example, a packet may be an RTP packet having an RTP payload format. For example, a frame may be a frame that is encoded by an Enhanced Voice Service (EVS) codec. If the electronic apparatus 200 receives a bitstream, the packet separator 310 may be optionally included.

The packet separator 310 may calculate and allocate a media timestamp each frame existing in the received RTP packet. The RTP packet may include an RTP header and an RTP payload. A data field of the RTP header associated with the jitter buffer 360 may include an RTP timestamp and an RTP sequence number. For example, a data structure of each frame extracted by the packet separator 310 may include frame payload data including a payload size, an arrival timestamp of an RTP packet including a corresponding frame, a media timestamp in an RTP time scale unit derived from an RTP timestamp of a packet, an RTP time scale as specified in the specification of the RTP payload format, a Silence Insertion Descriptor (SID) flag, and a partial copy flag. The SID flag may be provided to the jitter buffer 360 to operate the jitter buffer 360 independently from an audio codec. For example, in case of EVS, AMR, and AMR-WB codecs, the SID flag may be determined from a size of frame payload data.

Hereinafter, a method of estimating a target playout delay of a current frame to determine an adaptation method of the current frame through the parameter determiner 320, the target playout delay estimator 330, the late loss determiner 340, and the adaptation controller 350 will be described with reference to FIGS. 4 through 8.

The parameter determiner 320 acquires a network parameter to acquire an estimation function for estimating a target playout delay of a current frame.

Figure 4:
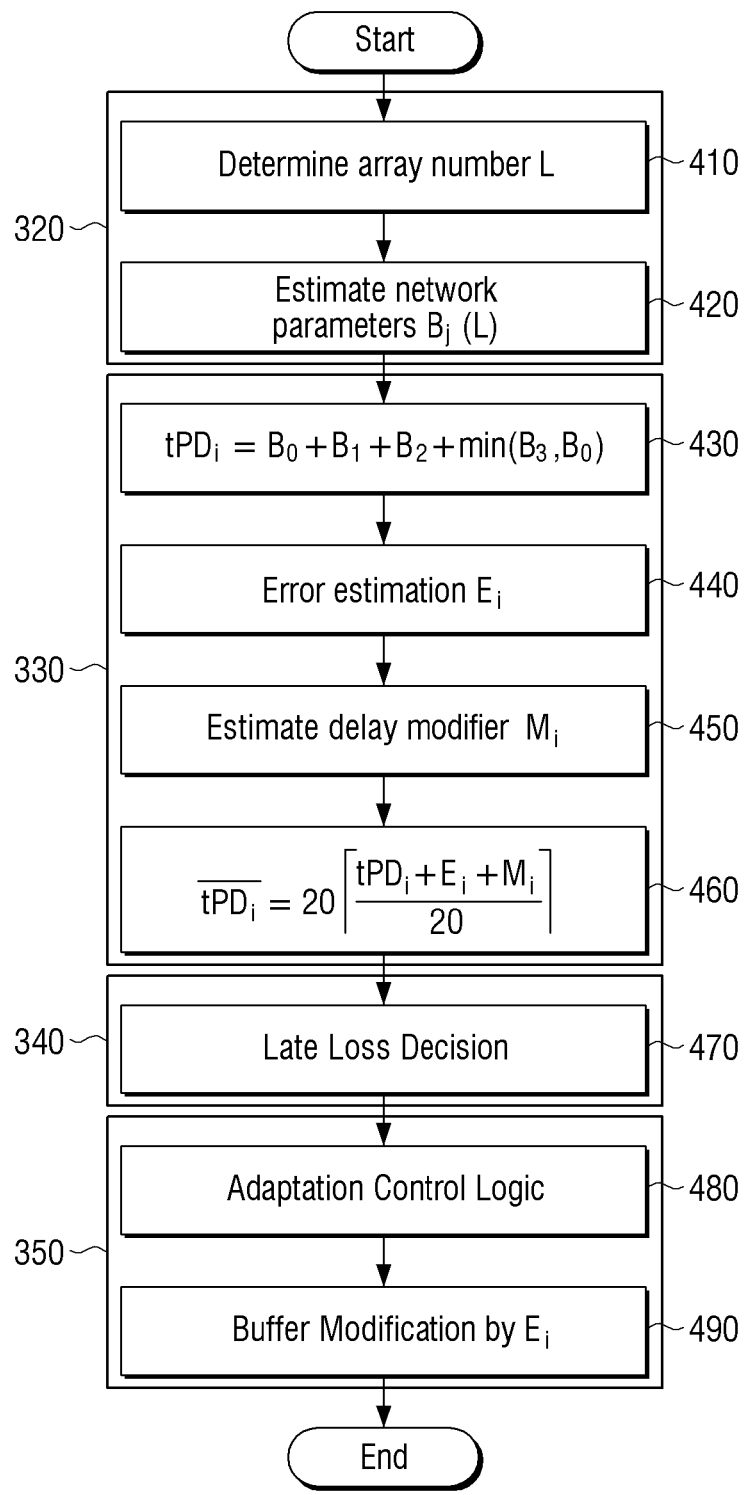
FIG. 4 is a flowchart of a method of estimating a target playout delay of an electronic apparatus to determine an adaptation method according to an exemplary embodiment of the present inventive concept.

In detail, the parameter determiner 320 determines an array number L for estimating a target playout delay in operation 410 of FIG. 4. If a linear estimation error is lower than 4% for a general delay, the number of arrays may be set to a minimum value (e.g., 60). If the linear estimation error value is higher than or equal to 4%, the number of arrays increases one by one until the number of arrays reaches a maximum value. Here, a hangover algorithm may be used to prevent an excessive change in the number of arrays.

Figure 5:
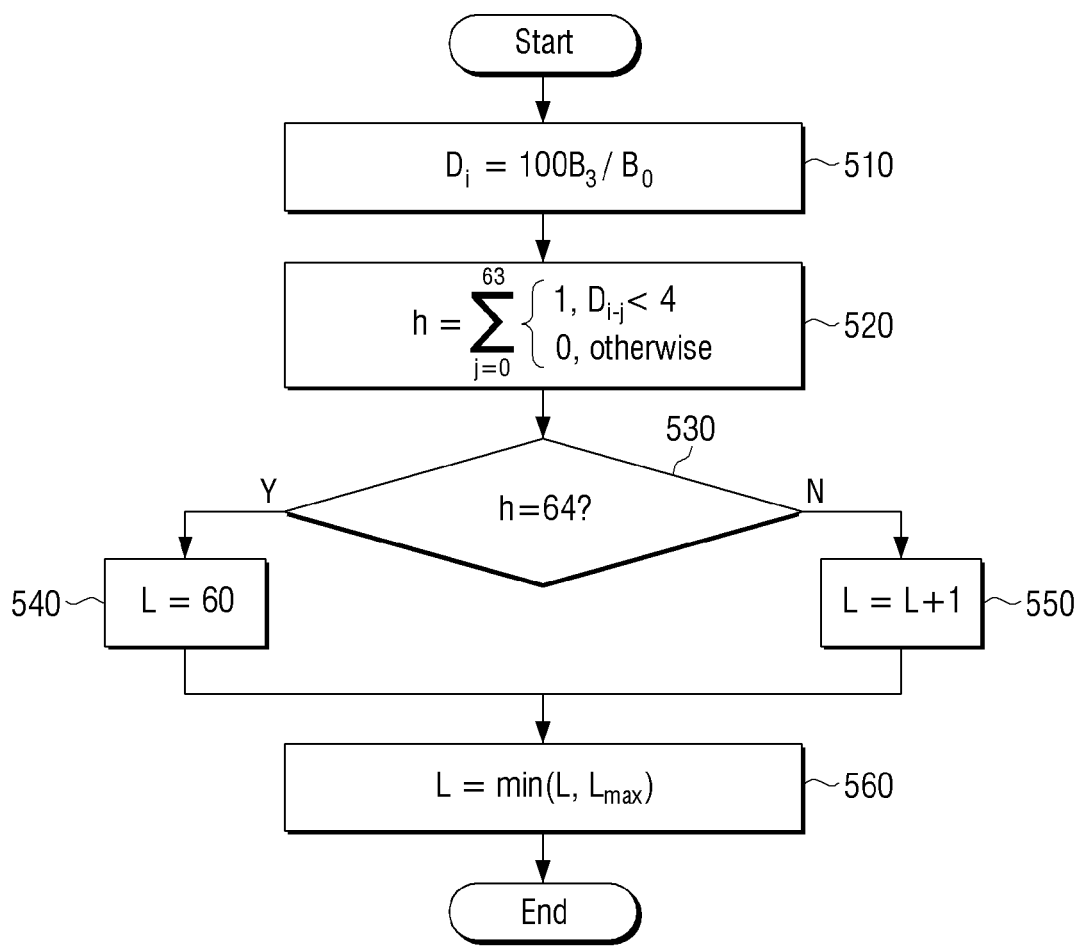
FIG. 5 is a flowchart of a method of calculating a hangover for changing the number of arrays used for a playout delay estimation using network status information according to an exemplary embodiment of the present inventive concept.

FIG. 5 is a flowchart of a method of calculating a hangover for changing the number of arrays used for a playout delay estimation according to network status information according to an exemplary embodiment of the present inventive concept.

In operation 510, the parameter determiner 320 determines a linear estimation error value $D_i$ for a general delay of a frame. Here, methods of determining $B_0$ and $B_3$ will be described later. In operation 520, the parameter determiner 320 determines the number of frames where the linear estimation error value $D_i$ is lower than 4% among 64 previous frames. If all of the 64 previous frames are lower than 4% in operation 530, the parameter determiner 320 determines the number L of arrays used for a playout delay estimation as 60 in operation 540. If any one of the 64 previous frames is higher than or equal to 4% in operation 530, the parameter determiner 320 increases the number L of arrays used for the playout delay estimation one by one in operation 550. The parameter determiner 320 also determines a smaller one of a calculated value L and $L_{max}$ (e.g., 500) as the number L of arrays used for the playout delay estimation in operation 560.

In other words, if a network status is instable, the parameter determiner 320 may increase the number of arrays used for the playout delay estimation. If the network status is stable, the parameter determiner 320 may decrease the number of arrays used for the playout delay estimation.

In operation 420 of FIG. 4, the parameter determiner 320 determines a network parameter by using the determined number of arrays and network status information of packets that are received and played.

In detail, the parameter determiner 320 determines network parameters for analyzing a status of a network by using received RTP packets. The most important information for determining this parameter is a delay value $d_i$ of the network. The delay value $d_i$ may be checked by analyzing header information of a packet. As a calculation example, the delay value $d_i$ may be calculated by using a difference value between a sending timestamp and a receiving timestamp. A delay value is acquired in unit of ms. The jitter buffer 360 stores $L_{max}$ delay values that are most recently transmitted. Therefore, a real delay value is calculated by using L entries ($L \times L_{max}$).

In particular, the parameter determiner 320 may determine a network parameter as in Equation 1 below.

$$B_0 = \frac{\sum_i d_i}{L} \quad (1)$$

(Mean value showing a general level of delay)

$$B_1 = \frac{\sum_i |d_i - \sum_j d_j / L|}{L} \quad (2)$$

(First absolute centered moment showing average offset from general level)

$$B_2 = \frac{\sum_i |d_i - d_{i-1}|}{L} + \frac{\sum_i ||d_{i-d_{i-1}}| - \sum_j |d_j - d_{j-1}||}{L} \quad (3)$$

(Average fluctuation of network delay showing average short term fluctuation of network)

-continued $$B_3 = \frac{\sum_i |d_i - L_i|}{\sum_i d_i} \text{(Error of linear prediction)},$$ (4)

$$L_i = \frac{\max(d) - \min(d)}{L} i + \max(d)$$

The target playout delay estimator 330 acquires an initial estimation function tPD$_i$ for estimating a target playout delay by using a determined parameter in operation 430 of FIG. 4.

$$tPD_i = B_0 + B_1 + B_2 + \min(B_3, B_0)$$ (5)

The target playout delay estimator 330 acquires a function for calculating an initial target playout delay and calculates an error value E$_i$ based on a real transmitted network delay value of a current frame in operation 440 of FIG. 4. Here, the error value E$_i$ may be calculated through a difference between a playout delay value of the current frame estimated through an initial estimation function and a network transmission delay value of the current frame that is not played.

Figure 6:
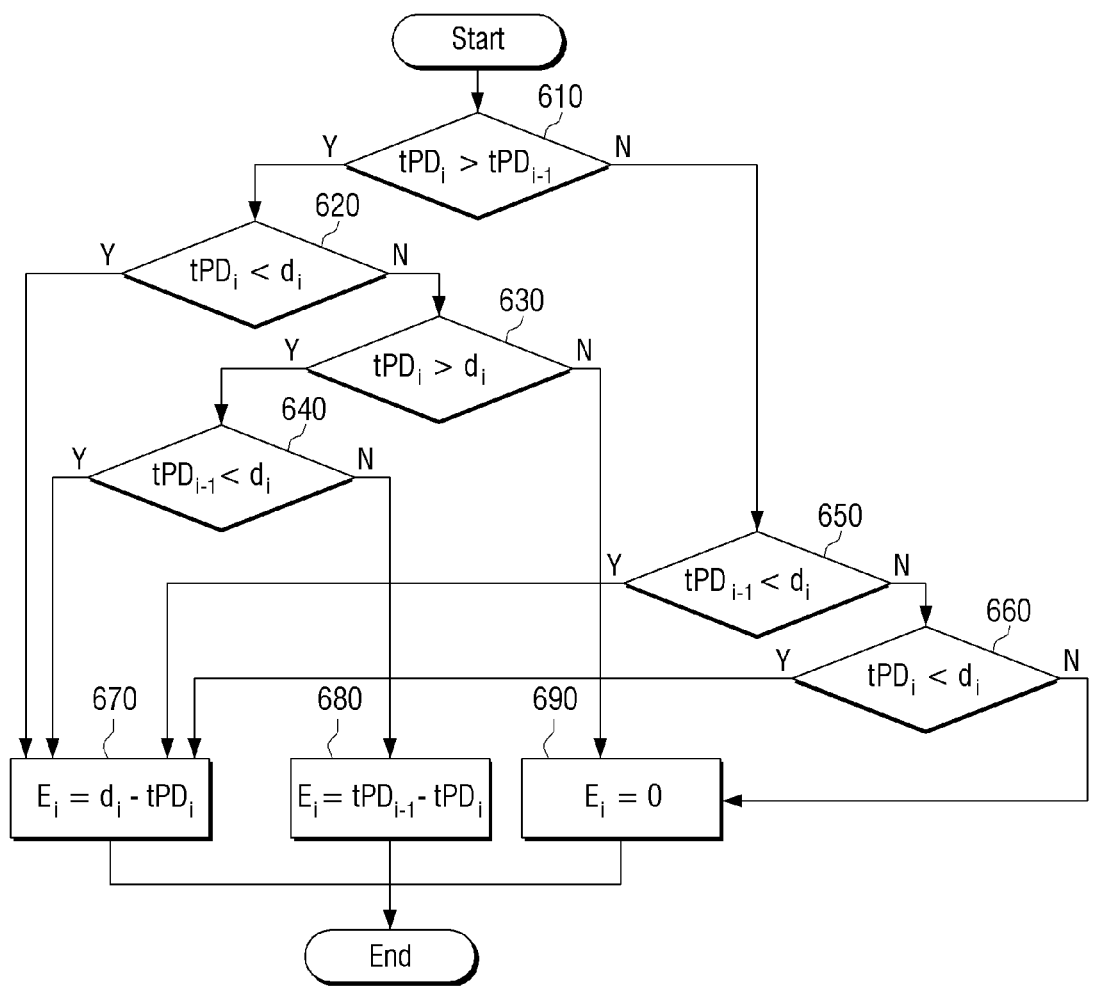
FIG. 6 is a flowchart of a method of acquiring an error value according to an exemplary embodiment of the present inventive concept.

FIG. 6 is a flowchart of a method of acquiring an error value E$_i$ according to an exemplary embodiment of the present inventive concept.

The target playout delay estimator 330 compares a target playout delay value tPD$_i$ of a current frame estimated through an initial estimation function and a target playout delay value tPD$_{i-1}$ of a previous frame in operation 610.

If the target playout delay value tPD$_{i-1}$ of the current frame is greater than the target playout delay value tPD$_{i-1}$ of the previous frame, the target playout delay estimator 330 compares the target playout delay value tPD$_i$ of the current frame and a real network delay value d$_i$ of the current frame in operations 620 and 630.

If the target playout delay value tPD$_i$ of the current frame is smaller than the real network delay value d$_i$ of the current frame in operation 620, the target playout delay estimator 330 calculates a difference value between the real network delay value d$_i$ of the current frame and the target playout delay value tPD$_i$ of the current frame as the error value E$_i$ in operation 670.

If the target playout delay value tPD$_i$ of the current frame is greater than the real network delay value d$_i$ of the current frame in operation 630, the target playout delay estimator 330 compares the target playout delay value tPD$_{i-1}$ of the previous frame and the real network delay value d$_i$ of the current frame in operation 640.

If the target playout delay value tPD$_{i-1}$ of the previous frame is smaller than the real network delay value d$_i$ of the current frame in operation 640, the target playout delay estimator 330 calculates a difference value between the real network delay value d$_i$ of the current frame and the target playout delay value tPD$_i$ of the current frame as the error value E$_i$ in operation 670.

If the target playout delay value tPD$_{i-1}$ of the previous frame is greater than or equal to the real network delay value d$_i$ of the current frame in operation 604, the target playout delay estimator 330 calculates a difference value between the target playout delay value tPD$_{i-1}$ of the previous frame and the target playout delay value tPD$_i$ of the current frame as the error value E$_i$ in operation 680.

If the target playout delay value tPD$_i$ of the current frame is smaller than or equal to the target playout delay value tPD$_{i-1}$ of the previous frame in operation 610, the target playout delay estimator 330 compares the target playout delay value tPD$_{i-1}$ of the previous frame and the real network delay value d$_i$ of the current frame in operation 650.

If the target playout delay value tPD$_{i-1}$ of the previous frame is smaller than the real network delay value d$_i$ of the current frame in operation 650, the target playout delay estimator 330 calculates a difference value between the real network delay value d$_i$ of the current frame and the target playout delay value tPD$_i$ of the current frame as the error value E$_i$ in operation 670.

If the target playout delay value tPD$_{i-1}$ of the previous frame is greater than or equal to the real network delay value d$_i$ of the current frame in operation 650, the target playout delay estimator 330 compares the target playout delay value tPDi of the current frame and the real network delay value d$_i$ of the current frame in operation 660. If the target playout delay value tPDi of the current frame is smaller than the real network delay value di of the current frame, the target playout delay estimator 330 calculates a difference value between the real network delay value di of the current frame and the target playout delay value tPD$_i$ of the current frame as the error value E$_i$ in operation 670.

If the real network delay value d$_i$ of the current frame is equal to the target playout delay value tPD$_i$ of the current frame in operations 630 and 660, the target playout delay estimator 330 calculates the error value E$_i$ as 0 in operation 690.

In other words, the target playout delay estimator 330 may update an estimation function in consideration of a real transmitted network delay value of the current frame that is not played. A fluctuation in a target playout delay may be minimized by updating the estimation function in consideration of an error value.

Input data (i.e., the network delay value d$_i$) may be updated so as to compensate for an error value even in a next frame.

The target playout delay estimator 330 calculates a delay modifier M$_i$ based on various elements such as network statistics, a current mode, etc. in operation 450 of FIG. 4.

In detail, since network delays of all packets are not required, the target playout delay estimator 330 may determine upper values of a network delay of a transmitted packet in unit of intervals as follows.

$$LM_j = \max(d_{jK+i})$$

$$i = (0,k)$$ (6)

wherein K denotes a size of an interval for analysis, and a length of the interval is 50. Values LM$_j$ denote a form of a network delay of a packet. A coefficient stcf$_i$ is acquired as in Equation 7 below:

$$stcf_i = \sum_{h=0}^{4}(PD_{i-1} - \max(LM_{2h}, LM_{2h+1}))(5-h),$$ (7)

wherein PD$_{i-1}$ may be a real playout delay value of a previous frame.

The calculated coefficient stcf$_i$ has value of 0~1 through the normalization as shown below:

$$sL_i = 1 - \min\left(1, \max\left(0, \frac{stcf_i - 200}{1500}\right)\right)$$ (8)

The coefficient stcf$_i$ is used as a value by which a maximum analysis length L$_{max}$ is multiplied.

A parameter as in Equation 9 is acquired by using these coefficients.

$$M_I = \frac{\sum d_i}{I \cdot sL_i} \text{(Mean value of delay)} \qquad (9)$$

$$D_I = \sqrt{\frac{\sum d_i^2 - I \cdot sL_i \cdot M_I^2}{I \cdot sL_i - 1}} \text{ (variance of delay)} \qquad (10)$$

wherein 1 may have preset three values 100, 300, and 500.

Cumulative switching conditions h may be calculated by using an average value and a dispersion value to determine a three-sigma condition.

$$h = \sum_I \begin{cases} 1, & PD_{i-1} > M_I + 3D_I + c_I \\ 0, & \text{otherwise} \end{cases} \qquad (11)$$

wherein $c_1$ denotes a constant for determining a delay shift.

The cumulative number (e) of packets having a delay value $d_i$ greater than a delay value $PD_{i-1}$ of a previous frame is defined as below:

$$\theta = \sum_I \begin{cases} 1, & \text{if } \forall (d_i \ldots d_{i-I-sL_j}) > PD_{i-1} - V_I \\ 0, & \text{otherwise} \end{cases} \qquad (12)$$

wherein $v_1$ is a constant for determining a delay shift.

That is, the cumulative number (e) is calculated from the total of cases where a delay value $d_i$ greater than a delay value $PD_{i-1}$ within a predefined analysis scope, and the calculated value is used for calculating the final delay modifier.

The greater the cases where a delay value $d_i$ greater than a delay value $PD_{i-1}$ are, the greater the cumulative number (e) would increase. If the cumulative number (e) increases, the target playout delay would be prolonged.

A delay modifier is finally determined as in Equation 13 below:

$$M = \mod e(h+e) \qquad (13)$$

wherein mode is a scaling coefficient according to a High Quality (HQ) mode and a Low Delay (LD) mode.

Also, the target playout delay estimator 330 may update an initial estimation function based on an error value and a delay modifier to acquire a final estimation function for estimating a target playout delay of a current frame as in Equation 14 below:

$$\overline{tPD_i} = 20 \left\lceil \frac{tPD_i + E_i + M_i}{20} \right\rceil \qquad (14)$$

The late loss determiner 340 determines late loss information of a current frame in operation 470 of FIG. 4.

Figure 7:
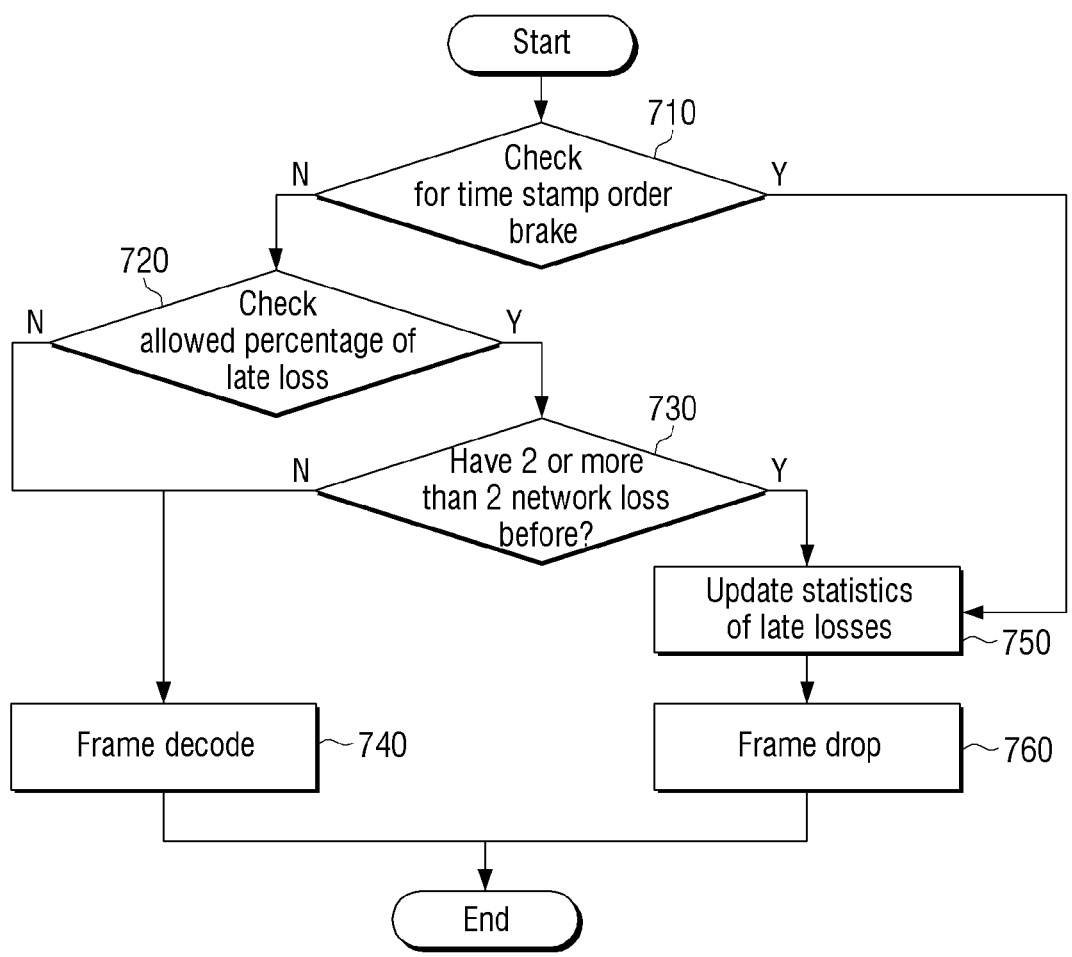
FIG. 7 is a flowchart of a method of determining a late loss according to an exemplary embodiment of the present inventive concept.

This will be now described with reference to FIG. 7.

The late loss determiner 340 checks a timestamp value, which may be acquired from a current transmitted packet, to determine whether an order of a frame is changed in operation 710.

If the order of the frame is changed in operation 710, the late loss determiner 340 checks an allowed percentage of a late loss to determine whether the late loss is within a preset value in operation 720. In detail, the allowed percentage may be calculated as in Equation 15 below:

$$\frac{(nLL+1)}{(nFrames+1)} < 0.01 \qquad (15)$$

wherein nLL denotes a number of late loss frames.

If the allowed percentage of the late loss is not within the preset value in operation 720, the late loss determiner 340 performs normal decoding with respect to a frame in operation 740.

If the allowed percentage of the late loss is within the preset value in operation 720, the late loss determiner 340 checks whether two or more frames disappear before in operation 730.

If the two or more frames do not disappear in operation 730, the late loss determiner 340 performs normal decoding with respect to a frame in operation 740.

If the two or more frames disappear in operation 730, the late loss determiner 340 updates statistics of late loss in operation 750 and drops a frame in operation 760. If the order of the frame is changed in operation 710, the late loss determiner 340 updates the statistics of the late loss in operation 750 and drops the frame in operation 760.

This method allows a late loss under control of a target playout delay. For example, this method considers that a fluctuation in a network delay is not important, and a playout delay may be kept. This case is determined by a next algorithm. Late loss probability wLL is determined as in Equation 16 below:

$$wLL = \begin{cases} 1, & \text{if} sys\_ms - \max(tPD_i, PD_{i-1}) > rtpTS_i \\ 0, & \text{otherwise} \end{cases} \qquad (16)$$

wherein sys_ms is a system time of ms unit, $rtpTS_i$ denotes a timestamp of an $i^{th}$ packet.

Here, when at least two packets disappear due to a network loss, a decision on a late loss is determined based on a late loss probability. Therefore, when a first frame is received after a burst loss occurs, an existing delay may be kept instead of an immediate delay increase in a target playout delay $tPD_i$.

The adaptation controller 350 determines an adaptation method through an adaptation control logic in operation 480 of FIG. 4. In particular, the adaptation controller 350 may determine an adaptation method for adjusting a playout delay of the current frame by using a target playout delay estimation value $\overline{tPD_i}$ of the current frame calculated by the target playout delay estimator 330, the late loss probability wLL determined by the late loss determiner 340, the number N of samples per one frame, and a playout delay value $PD_{i-1}$ of the previous frame.

Here, N denotes a size of a frame used in a codec and may be 20 ms in an EVS codec.

Figure 8:
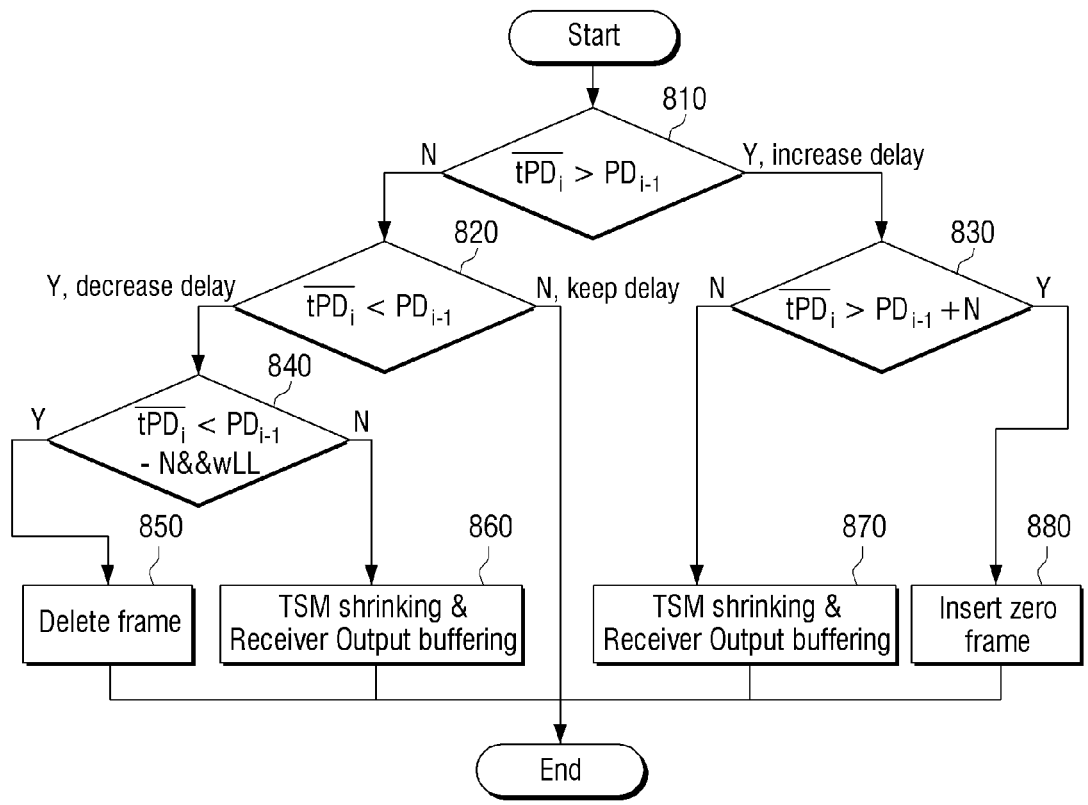
FIG. 8 is a flowchart of a method of determining an adaptation method using an estimated target playout delay according to an exemplary embodiment of the present inventive concept.

A method of determining an adaptation method will now be described in detail with reference to FIG. 8.

In operations 810 and 820, the adaptation controller 350 compares a target playout delay estimation value $\overline{tPD_i}$ of a current frame and a playout delay value $PD_{i-1}$ of a previous frame.

If the target playout delay estimation value $\overline{tPD_i}$ of the current frame is smaller than the playout delay value $PD_{i-1}$ of the previous frame in operations 810 and 820, the adaptation controller 350 compares the target playout delay estimation value $\overline{\text{tPD}}_i$ of the current frame with a difference between the playout delay value $\text{PD}_{i-1}$ of the previous frame and the number of samples per one frame and determines a late loss probability in operation 840.

If the target playout delay estimation value $\overline{\text{tPD}}_i$ of the current frame is smaller than the difference between the playout delay value $\text{PD}_{i-1}$ of the previous frame and the number of samples per one frame, and the late loss probability is 1 in operation 840, the adaptation controller 350 determines an adaption method of the current frame as an adaptation method referred to as frame deleting in operation 850. If not so in operation 840, the adaptation controller 350 determines the adaptation method of the current frame as an adaptation method referred to as TSM shrinking in operation 860.

If the target playout delay estimation value $\overline{\text{tPD}}_i$ of the current frame is greater than the playout delay value $\text{PD}_{i-1}$ of the previous frame in operation 810, the adaptation controller 350 compares the target playout delay estimation value $\overline{\text{tPD}}_i$ of the current frame with a sum of the playout delay value $\text{PD}_{i-1}$ of the previous frame and the number N of samples per one frame in operation 830.

If the target playout delay estimation value $\overline{\text{tPD}}_i$ of the current frame is smaller than or equal to the sum of the playout delay value $\text{PD}_{i-1}$ of the previous frame and the number N of samples per one frame in operation 830, the adaptation controller 350 determines the adaptation method of the current frame as an adaptation method referred to as TSM stretching in operation 870.

If the target playout delay estimation value $\overline{\text{tPD}}_i$ of the current frame is greater than the sum of the playout delay value $\text{PD}_{i-1}$ of the previous frame and the number N of samples per one frame in operation 830, the adaptation controller 350 determines the adaptation method of the current frame as an adaptation method referred to as zero frame inserting in operation 880.

Through an adaptation method as described above, the electronic apparatus 200 may provide a high-quality sound and decrease a playout delay or compensate for a packet error according to various network situations.

Also, the adaptation controller 350 may update a network delay value $d_j$ based on the error value $E_i$ calculated in operation 440 of FIG. 4.

$$d_j = d_j + sE_i, \text{for all } j \quad (17)$$

wherein s denotes a scale value varying according to a HQ mode or an LD mode. Also, j is used to classify entries of all delays of a previous network. After a buffer is updated, an error is compensated for in a next frame.

Referring to FIG. 3 again, the jitter buffer 360 may store frames extracted by the packet separator 310 for decoding and playing. Statistics may be updated in response to the stored frames. The frames stored in the jitter buffer 360 may not be immediately provided to the audio decoder 370, but a frame-based adaptation may be performed with respect to the frames to smooth a network jitter. As an example of the frame-based adaptation, a zero frame may be inserted, a frame stored in the jitter buffer 330 may be removed, or a component noise frame may be added or removed.

An RTP packet may be transmitted together with a network jitter, i.e., time varying, and may be reordered, lost, or reproduced on a network. The jitter buffer 360 may store frames included in an RTP packet received from a network and provide the frames to the audio decoder 370 in an accurate order. The jitter buffer 360 may have a ring buffer structure having a fixed capacity. If a frame length is 20 ms in initialization, the jitter buffer 360 may be allocated a capacity for storing active audio data of 3 seconds, i.e., 150 entries, to prevent an excessive delay and memory use in a particular environment. When the jitter buffer 360 overflows with frames, the oldest frame may be removed from the jitter buffer 360. A depth of the jitter buffer 360 may be dynamic and may be controlled by the adaptation controller 350.

The audio decoder 370 may decode frames provided from the jitter buffer 360 into PCM data. For example, the audio decoder 370 may decode a frame by using an EVS codec.

The TSM applier 380 may perform a signal-based adaptation to change a playout delay of a signal decoded by the audio decoder 370, i.e., a playout delay of the PCM data. The TSM applier 380 may perform TSM for time shrinking or time stretching of the signal decoded by the audio decoder 370 in response to the adaptation method determined by the adaptation controller 350. The TSM applier 380 may generate additional samples to increase a playout delay or remove samples from the signal decoded by the audio decoder 370 to decrease the playout delay.

The receiver buffer 390 may temporarily store the PCM data provided from the TSM applier 380 and output the PCM data in a fixed frame size. The receiver buffer 390 includes a first-in, first-out (FIFO) queue for the PCM data. If the signal-based adaptation is performed, the TSM applier 380 does not generate a frame having a fixed length, e.g., 20 ms. Therefore, PCM data having a fixed length is output by using the receiver buffer 390.

According to an exemplary embodiment of the present inventive concept, following methods may be used to decrease complexity of an algorithm for adjusting a playout delay of a current frame as described above.

Figure 9A:
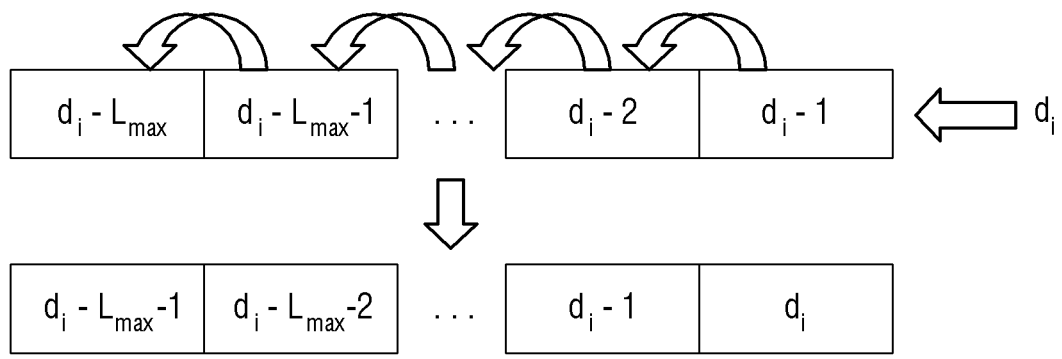
FIG. 9A illustrates a general method of updating a delay buffer used in a method of determining a late loss shown in FIG. 7 according to an exemplary embodiment of the present inventive concept.

A first method is to decrease complexity in a late loss calculation method described with reference to FIG. 7. FIG. 9A illustrates a general delay buffer updating method used in a late loss shown in FIG. 7. According to the general delay buffer updating method, if a whole buffer size $L_{max}$ is kept, and a new delay $d_i$ is input, all contents of a buffer are shifted forward one by one, and then a new value is added as shown in FIG. 9A.

Figure 9B:
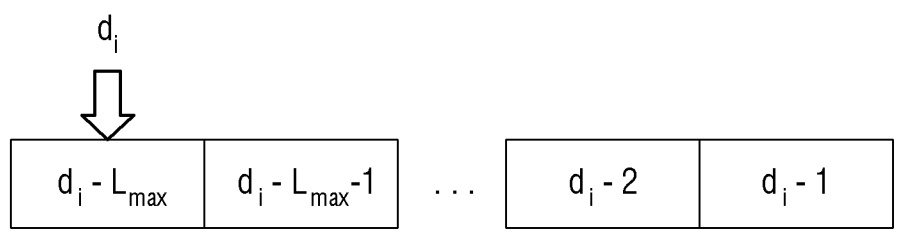
FIG. 9B illustrates a method of updating a ring delay buffer providing a lower complexity than the general method of FIG. 9A according to an exemplary embodiment of the present inventive concept.

However, FIG. 9B illustrates a ring delay buffer updating method providing lower complexity than the general delay buffer updating method of FIG. 9A. According to the ring delay buffer updating method, a new delay value $d_i$ is located in particular position S, and then a next S value becomes a counter of locations. A range of the counter is $[0, \ldots, L_{max}-1]$ and becomes $S=(S+1) \bmod L_{max}$ for a next packet. A new value is not located at an end at all times in this process, but total calculations may be lowered.

A second method is to use a joint calculation method when acquiring a maximum value and a minimum value of a ring delay buffer. In general, if a maximum and a minimum value are acquired for an array of total $L_{max}$, complexity reading data is applied to each of the maximum and minimum values. However, if the maximum and minimum values are simultaneously acquired, the number of times reading data may decrease by half.

A third method is to optimize a linear estimation error calculation algorithm. A set including $L_i$ is acquired for a linear estimation error calculation, and all of values of the set are located on a straight line.

$$L_i = \frac{\max(d) - \min(d)}{L-1} i + \max(d) \quad (18)$$

Also, a linear estimation value $L_i$ and an error value of real data may be calculated, and complexity is required in this process. A starting point $L_0$ and a delta value are calculated as in Equation 19 below to decrease complexity.

$$L_0 = \max(d) \qquad (19)$$
$$\text{delta} = \frac{\max(d) - \min(d)}{L-1}$$

Merely an addition operation is performed to acquire the following value.

$$L_{i+1} = L_i + \text{delta} \qquad (20)$$

A fourth method is a joint calculation of a mean value M1 and a dispersion value $D_1$ of value 1 varying each time. It is important to reuse a used value in order to acquire a mean and a dispersion of a set having a particular size at low complexity. Two values are acquired as in Equation 21 below:

$$\text{CumAvg}_i = \text{CumAvg}_{i-1} + n_i$$
$$\text{CumAvg2}_i = \text{CumAvg2}_{i-1} + n_i^2 \qquad (21)$$

When reaching 11=I, a calculation of an average and a dispersion become possible.

$$Avg_{I1} = \frac{CumAvg_{I1}}{I1} \qquad (22)$$
$$Var_{I1} = \frac{CumAvg2_{I1} - Avg_{I1}^2 \circ I1}{I1 - 1}$$

When calculating the above mean and dispersion in a condition of 12>11, calculated $\text{CumAvg}_i$ and $\text{CumAvg2}_i$ may be used, enabling the calculation to have less complexity.

A fifth method is a buffer copy that is replaced by a pointer interchange. Pointers may be interchanged instead of copying a whole buffer to minimize complexity required for copying.

Figure 10:
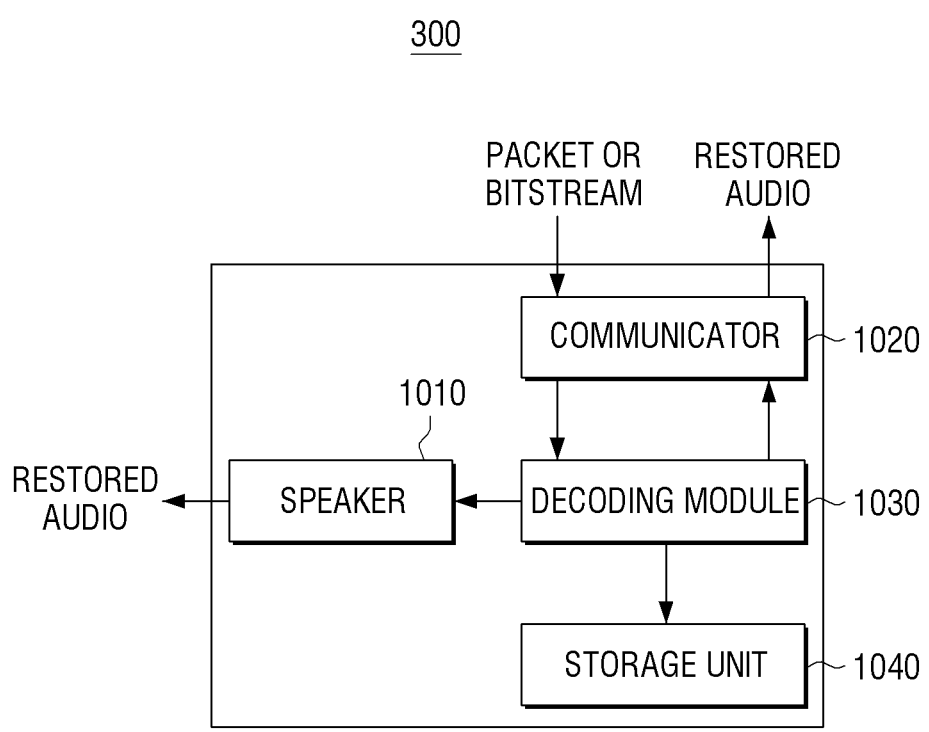
FIG. 10 is a block diagram of a configuration of an electronic apparatus according to an exemplary embodiment of the present inventive concept.

FIG. 10 is block diagram of a configuration of an electronic apparatus 300 according to an exemplary embodiment of the present inventive concept. Referring to FIG. 10, the electronic apparatus 300 may include a speaker 1010, a communicator 1020, a decoding module 1030 and a storage unit 1040. The communicator 1020 may receive at least one selected from encoded bitstream and audio signal provided from an external source or transmit at least one selected from a restored audio signal acquired as a decoding result of the decoding module 1030 and an audio bitstream acquired as an encoding result.

The communicator 1020 is configured to transmit and receive data with an external multimedia device or server through a wireless network, such as wireless Internet, wireless intranet, a wireless phone network, a wireless local area network (LAN), Wi-Fi, Wi-Fi Direct (WFD), 3 Generation (3G), 4 Generation (4G), Bluetooth, Infrared Data Association (IrDA), Radio Frequency Identification (RFID), Ultra-WideB and (UWB), Zigbee, or Near Field Communication (NFC), or a wired network such as a wired phone network, wired Internet, or the like.

The decoding module 1030 may receive a packet or a bitstream provided through the communicator 1020 and perform a playout delay adjustment according to the above-described exemplary embodiment to perform decoding.

The storage unit 1040 may store a restored audio signal generated by the decoding module 1030. The storage unit 1040 may store various types of programs necessary for operating the electronic apparatus 200.

The speaker 1010 may output the restored audio signal generated by the decoding module 1030 to an outside.

Figure 11:
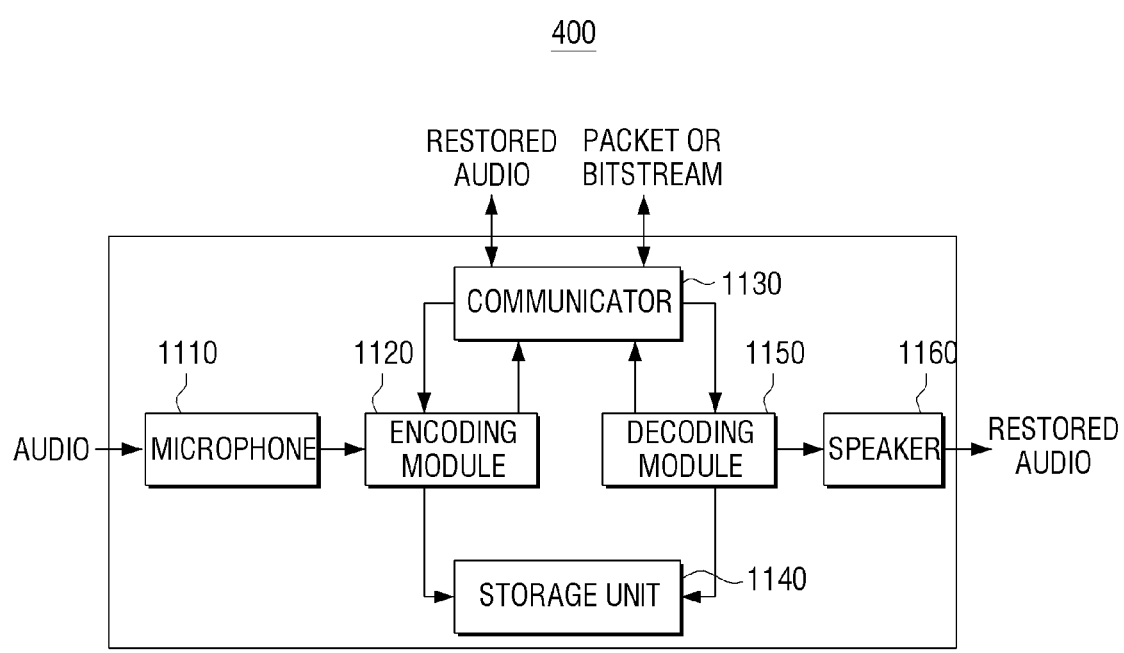
FIG. 11 is a block diagram of a configuration of an electronic apparatus according to another exemplary embodiment of the present inventive concept.

FIG. 11 is a block diagram of a configuration of an electronic apparatus 400 according to another exemplary embodiment of the present inventive concept. The electronic apparatus 400 illustrated in FIG. 11 may include a communicator 1130, an encoding module 1120, and a decoding module 1150. Also, the electronic apparatus 400 may further include a storage unit 1140 that stores an audio bitstream or a restored audio signal according to a use purpose of an audio bitstream acquired as an encoding result or a restored audio signal acquired as a decoding result. The electronic apparatus 400 may further include a microphone 1110 or a speaker 1160. Here, the encoding module 1120 and the decoding module 1150 may be integrated with another element (not shown) of the electronic apparatus 400 to be realized as at least one or more processors (not shown). Some of elements of FIG. 11 overlap with elements of the electronic apparatus 300 of FIG. 10, and thus their detailed descriptions are omitted.

The communicator 1130 may receive at least one selected from an audio provided from an external source and an encoded bitstream or may transmit and receive at least one selected from a restored audio and an audio bitstream acquired as an encoding result of the encoding module 1120.

The encoding module 1120 may include various types of codecs to perform encoding with respect to an audio or a speech signal so as to generate a bitstream or a packet.

The decoding module 1150 may correspond to the encoding module 1120 or may be realized independently of the encoding module 1120. The decoding module 1150 may receive a packet or a bitstream provided through the communicator 1130 and apply the playout delay adjustment according to the above-described exemplary embodiments to perform decoding.

The storage unit 1140 may store various types of programs necessary for operating the electronic apparatus 200.

The microphone 1110 may provide an audio signal, which is received from a user or an external source, to the encoding module 1120.

The speaker 1160 outputs a voice signal decoded by the decoding module 1150.

Figure 12:
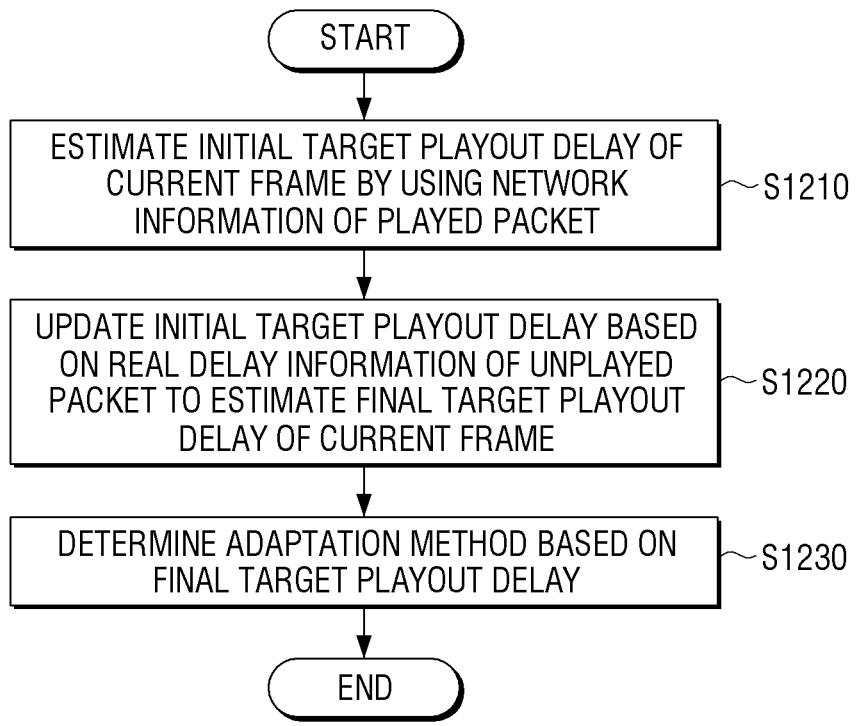
FIG. 12 is a flowchart of a playout delay adjustment method of an electronic apparatus, according to an exemplary embodiment of the present inventive concept.

FIG. 12 is a flowchart of a playout delay adjustment method of the electronic apparatus 200, 300, or 400 according to an exemplary embodiment of the present inventive concept.

In operation S1210, the electronic apparatus 200, 300 or 400 estimates an initial target playout delay of a current frame by using network information of a played packet.

In operation S1220, the electronic apparatus 200, 300 or 400 updates the initial target playout delay based on real delay information of an unplayed packet to estimate a final target playout delay of the current frame.

In operation S1230, the electronic apparatus 200, 300 or 400 determines an adaptation method based on the final target playout delay.

According to exemplary embodiments of the present inventive concept as described above, a high-quality sound may be provided, and a playout delay may decrease or a packet error may be compensated for according to various network situations.

According to an exemplary embodiment of the present inventive concept, the electronic apparatus 200, 300 or 400 may set a mode thereof to one of a delay minimization mode and a sound quality maximization mode based on one of a communication service and a coding mode. The electronic apparatus 200, 300 or 400 may also estimate a target playout delay of a current frame according to the set mode. When calculating a function for estimating the target playout delay, a delay modifier $M_i$ may be acquired according to the set mode. The electronic apparatus 200, 300 or 400 may determine an adaptation method for adjusting a playout delay of a current frame based on an estimated target playout delay.

The electronic apparatus 200, 300 or 400 may be set to one of a delay minimization mode LD and a sound quality maximization mode HQ according to a type of a communication service used by the electronic apparatus 200, 300 or 400. Here, the type of the communication service may be VoLTE using an LTE network or VoWi-Fi using a Wi-Fi network.

In detail, since VoLTE has a standard requirement of an end-to-end delay, a late delay minimization function may be prioritized and used. Since VoWi-Fi is more generous with the end-to-end delay than VoLTE, a sound quality maximization function may be prioritized and used with losing some delays. Also, the electronic apparatus 200, 300 or 400 may automatically change a mode when handing over VoWi-Fi to VoLTE. This mode setting may automatically apply an optimization option according to communication service information (VoLTE/VoWi-Fi) considering an access network that may be checked by the electronic apparatus 200.

In particular, if a mode change is performed from VoLTE to VoWi-Fi by using an Evolved Packet Data Gateway (ePDG) handover function from VoWi-Fi to VoLTE or from VoLTE to VoWi-Fi, the electronic apparatus 200, 300 or 400 may automatically change a JBM function from a natural minimization mode for VoLTE to a sound quality maximization mode for VoWi-Fi to provide a high-quality sound service to each application in an optimization status.

A method of determining an optimization option according to a mode of a codec will be described. Table 1 below shows an example of a method of adding an EVS standard mode orienting a sound quality maximization to two types of modes mentioned above to selectively use a total of three modes in terms of setting a mode.

The electronic apparatus 200, 300 or 400 may include a voice communication terminal including a phone, a mobile phone, or the like, a broadcast or music device including a TV, an MP3 player, or the like, a fusion terminal device of the voice communication terminal and the broadcast or music device, or a user terminal of a teleconference or an interaction system but is not limited thereto. The electronic apparatus 200, 300 or 400 may be used as a client, a server, or a converter that is disposed between the client and the server.

For example, if the electronic apparatus 200, 300 or 400 is a mobile phone, the mobile phone may further include a user input unit (not shown) such as a keypad or the like, a user interface, a display displaying information processed by the mobile phone, or a processor controlling an overall function of the mobile phone. Also, the mobile phone may further include a camera unit that has a capturing function and at least one or more elements that perform functions necessary in the mobile phone.

If the electronic apparatus 200, 300 or 400 is a TV, the TV may further include a user input unit (not shown) such as a keypad or the like, a display displaying received broadcast information, or a processor controlling an overall function of the TV. Also, the TV may further include at least one or more elements that perform functions necessary in the TV.

The above-described exemplary embodiments may be written as a computer-executable program and may be embodied in a general-purpose digital computer that operates the program by using a computer readable recording medium. Also, a data structure, a program command, or a data file that may be used in the above-described exemplary embodiments may be recorded on a computer readable recording medium through various types of units. The computer readable recording medium may include all types of storage devices that store data that may be read by a computer system. Examples of the computer readable recording medium include magnetic media such as a hard disk, a floppy disk, and a magnetic tape, optical media such as CD-ROM, DVD, etc., magneto-optical media such as floptical disk, and a hardware device particularly configured to store and perform a program command like a read only memory (ROM), a random access memory (RAM), a flash memory, or the like. Also, the computer readable recording

TABLE 1

| Classification | | Coding Mode | |
|---|---|---|---|
| | | Primary Mode | Channel Aware Mode |
| Communication Service | VoLTE | Delay minimization mode Used for general portable phone call, high use frequency | Sound quality maximization mode (EVS standard) |
| | VoWi-Fi/VoIP (Internet) | Sound quality maximization mode Used for Internet such as mVoIP, WebRTC, etc. | Used in case where packet error possibility, such as disaster network, is high |

In addition to the communication service mentioned above, a coding mode is classified as in Table 1 above to apply an optimal mode according to each condition. In the present example, 3GPP EVS is cited as an example of the coding mode, and a general primary mode and a channel aware mode exist in EVS. Therefore, the general primary mode uses delay minimization or sound quality maximization according to network services, and the channel aware mode uses a standard EVS JBM mode orienting a sound quality maximization.

medium may be a transmission medium that transmits a signal designating a program command, a data structure, or the like. Examples of the program command may include a machine language code that is made by a compiler and a high-level language code that may be executed by a computer by using an interpreter or the like.

The foregoing exemplary embodiments and advantages are merely exemplary and are not to be construed as limiting the present inventive concept. The present teaching can be readily applied to other types of apparatuses. Also, the description of exemplary embodiments of the present inventive concept is intended to be illustrative, and not to limit the scope of the claims, and many alternatives, modifications, and variations will be apparent to those skilled in the art.

What is claimed is:

1. A playout delay adjustment method of an electronic apparatus, the playout delay adjustment method comprising:
   estimating an initial target playout delay of a current frame by using network status information of a played packet;
   estimating a final target playout delay of the current frame by updating the estimated initial target playout delay based on real delay information of an unplayed packet;
   identifying a late loss based on the estimated final target playout delay of the current frame;
   identifying an adaptation method based on the final target playout delay of the current frame, a playout delay of a previous frame, and information about the late loss; and
   adjusting a playout delay of the current frame by the adaptation method.

2. The playout delay adjustment method of claim 1, further comprising:
   determining a network parameter by using the network status information of the played packet; and
   acquiring an estimation function for estimating the initial target playout delay by using the network parameter.

3. The playout delay adjustment method of claim 2, further comprising:
   adjusting a number of arrays used for estimating a target playout delay according to a network status,
   wherein the network parameter is determined based on information about the adjusted number of arrays and the network status information of the played packet.

4. The playout delay adjustment method of claim 2, wherein the estimating of the final target playout delay comprises:
   calculating an error value based on a difference between an initial target playout delay value of the current frame acquired by using the estimation function and a real transmission delay value of the unplayed packet;
   calculating a delay modifier based on network statistics; and
   acquiring a final estimation function for estimating final target playout delay information based on the estimation function, the error value, and the delay modifier.

5. The playout delay adjustment method of claim 4, wherein the network status information is updated by the error value.

6. The playout delay adjustment method of claim 4, wherein the calculating the error value comprises comparing the initial target playout delay value of the current frame and a target playout delay value of the previous frame and calculating the error value based on a result of the comparing.

7. The playout delay adjustment method of claim 4, wherein the adaptation method is identified based on a playout delay estimation value of the current frame acquired through the final estimation function, a value of the playout delay of the previous frame, and the information about the late loss.

8. The playout delay adjustment method of claim 7, wherein the identifying of the late loss comprises identifying whether an order of a frame is changed, and dropping the frame when it is identified that the order of the frame is changed.

9. The playout delay adjustment method of claim 7, wherein the adaptation method is one selected from an adaptation method of removing a current frame, an adaptation method of decoding a current frame to decrease Time Scale Modification (TSM), an adaptation method of decoding a current frame to increase TSM, and an adaptation method of inserting a zero frame.

10. The playout delay adjustment method of claim 1, wherein the electronic apparatus operates in one of a sound quality maximization mode and a delay minimization mode according to a type of service performing a voice call to estimate a target playout delay.

11. An electronic apparatus comprising:
    a target playout delay estimator configured to estimate an initial target playout delay of a current frame by using network status information of a played packet and estimate a final target playout delay of the current frame by updating the estimated initial target playout delay based on real delay information of an unplayed packet;
    a late loss determiner configured to identify a late loss based on the final target playout delay of the current frame; and
    an adaptation controller configured to identify an adaptation method based on the final target playout delay of the current frame, a playout delay of a previous frame, and information about the late loss, and adjust a playout delay of the current frame by the adaptation method.

12. The electronic apparatus of claim 11, further comprising:
    a parameter determiner configured to determine a network parameter by using the network status information of the played packet,
    wherein the target playout delay estimator acquires an estimation function for estimating the initial target playout delay by using the network parameter.

13. The electronic apparatus of claim 12, wherein the parameter determiner adjusts a number of arrays used for estimating a target playout delay according to a network status and determines the network parameter based on information about the number of arrays and the network status information of the played packet.

14. The electronic apparatus of claim 12, wherein the target playout delay estimator acquires a difference between an initial target playout delay value of the current frame acquired by using the estimation function and a real transmission delay value of an unplayed packet, calculates an error value based on the difference, calculates a delay modifier based on network statistics, and acquires a final estimation function for estimating final target play delay information based on the estimation function, the error value, and the delay modifier.

15. The electronic apparatus of claim 14, wherein the network status information is updated by the error value.

16. The electronic apparatus of claim 14, wherein the target playout delay estimator compares the initial target playout delay value of the current frame and a target playout delay value of the previous frame and calculates the error value based on a result of the comparing.

17. The electronic apparatus of claim 14,
    wherein the adaptation controller determines the adaptation method based on a playout delay estimation value of the current frame acquired through the final estimation function, a value of the playout delay of the previous frame, and the information about the late loss.

18. The electronic apparatus of claim 17, wherein the adaptation method is one selected from an adaptation method of removing a current frame, an adaptation method of decoding a current frame to decrease TSM, an adaptation method of decoding a current frame to increase TSM, and an adaptation method of inserting a zero frame.

19. The electronic apparatus of claim 11, wherein the electronic apparatus operates in one of a sound quality maximization mode and a delay minimization mode according to a type of service performing a voice call to estimate a target playout delay.

20. A playout delay adjustment method of an electronic apparatus, the playout delay adjustment method comprising:
    setting a mode of the electronic apparatus to one of a delay minimization mode and a sound quality maximization mode based on one of a communication service and a coding mode;
    estimating a target playout delay of a current frame according to the set mode;
    identifying a late loss based on the estimated target playout delay of the current frame;
    identifying an adaptation method based on the estimated target playout delay of the current frame, a playout delay of a previous frame, and information about the late loss; and
    adjusting a playout delay of the current frame by the adaptation method.

* * * * *